US012776000B1

(12) United States Patent
Shen et al.

(10) Patent No.: US 12,776,000 B1
(45) Date of Patent: Oct. 27, 2026

(54) TECHNIQUES FOR GENERATING PORTRAIT ASPECT RATIO VIDEOS

(71) Applicant: Amazon Technologies, Inc., Seattle, WA (US)

(72) Inventors: Minmin Shen, Kirkland, WA (US); Kewen Chen, Bellevue, WA (US); Anne Thanh Thuy Ho, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 18/934,770

(22) Filed: Nov. 1, 2024

(51) Int. Cl.
*G06T 3/00* (2024.01)
*G06T 3/18* (2024.01)
*G06V 10/25* (2022.01)

(52) U.S. Cl.
CPC ................ *G06T 3/18* (2024.01); *G06V 10/25* (2022.01); *G06V 2201/07* (2022.01)

(58) Field of Classification Search
None
See application file for complete search history.

(56) References Cited

U.S. PATENT DOCUMENTS 12,505,671 B2 * 12/2025 Bharadwaj ........... G06V 10/462
2015/0109408 A1 * 4/2015 Sharma .................. H04N 23/69 348/39
2021/0012502 A1 * 1/2021 Mulford .............. G06F 3/04845

OTHER PUBLICATIONS

N. Frey, "AutoFlip: An Open Source Framework for Intelligent Video Reframing", Google Research, Feb. 13, 2020, 9 pages Available online at: https://research.google/blog/autoflip-an-open-source-framework-for-intelligent-video-reframing/.
H. Guan et al., "SeqRank: Sequential Ranking of Salient Objects", in Proceedings of the AAAI Conference on Artificial Intelligence, vol. 38 No. 3, pp. 1941-1949, Mar. 24, 2024.
T. Zhu et al., "Horizontal-to-Vertical Video Conversion," in IEEE Transactions on Multimedia, vol. 24, pp. 3036-3048, Jun. 23, 2021, Available online at: https://arxiv.org/abs/2101.04051.
T. Souček et al., "TransNet V2: An effective deep network architecture for fast shot transition detection", 4 pages, Aug. 11, 2020, Available online at: https://arxiv.org/abs/2008.04838.
H. Fang et al., "Salient Object Ranking with Position-Preserved Attention", 11 pages, Jun. 10, 2021, Available online at: https://arxiv.org/abs/2106.05047.

(Continued)

*Primary Examiner* — Martin Mushambo
(74) *Attorney, Agent, or Firm* — Kilpatrick Townsend & Stockton LLP

(57) ABSTRACT

The techniques described herein relate to generating a portrait aspect ratio video from a landscape aspect ratio video. The techniques can include a content editing engine identifying a first frame of a first shot of a landscape video and determining a plurality of objects in the first frame. The content editing engine can identify a primary subject of the plurality of objects based at least in part on the first frame. The content editing engine can generate a first set of bounding boxes for the primary subject. The content editing engine can generate a second set of bounding boxes for the primary subject based at least in part on the first set of bounding boxes. The second set of bounding boxes can have a portrait aspect ratio. The content editing engine can generate a portrait video based at least in part on the second set of bounding boxes.

20 Claims, 6 Drawing Sheets

(56) References Cited

OTHER PUBLICATIONS

K. Apostolidis et al., "A Fast Smart-Cropping Method and Dataset for Video Retargeting," in *2021 IEEE International Conference on Image Processing* (*ICIP*), Aug. 23, 2021, pp. 2618-2622, doi: 10.1109/ICIP42928.2021.9506390.

H. Zeng et al., "Grid Anchor Based Image Cropping: A New Benchmark and An Efficient Model," 14 pages, Sep. 18, 2019, Available Online at: https://arxiv.org/abs/1909.08989.

* cited by examiner

TECHNIQUES FOR GENERATING PORTRAIT ASPECT RATIO VIDEOS

BACKGROUND

Videos are a popular media format. However, videos are generally produced with a specific viewing experience in mind. For example, many videos are shot with a landscape or widescreen aspect ratio with the expectation that the video will be viewed on a landscape or widescreen aspect ratio display. Viewing a landscape video on a portrait aspect ratio display (commonly used by many mobile devices) can be suboptimal without additional processing.

BRIEF DESCRIPTION OF THE DRAWINGS

Various embodiments in accordance with the present disclosure will be described with reference to the drawings, in which.

DETAILED DESCRIPTION

Figure 1:
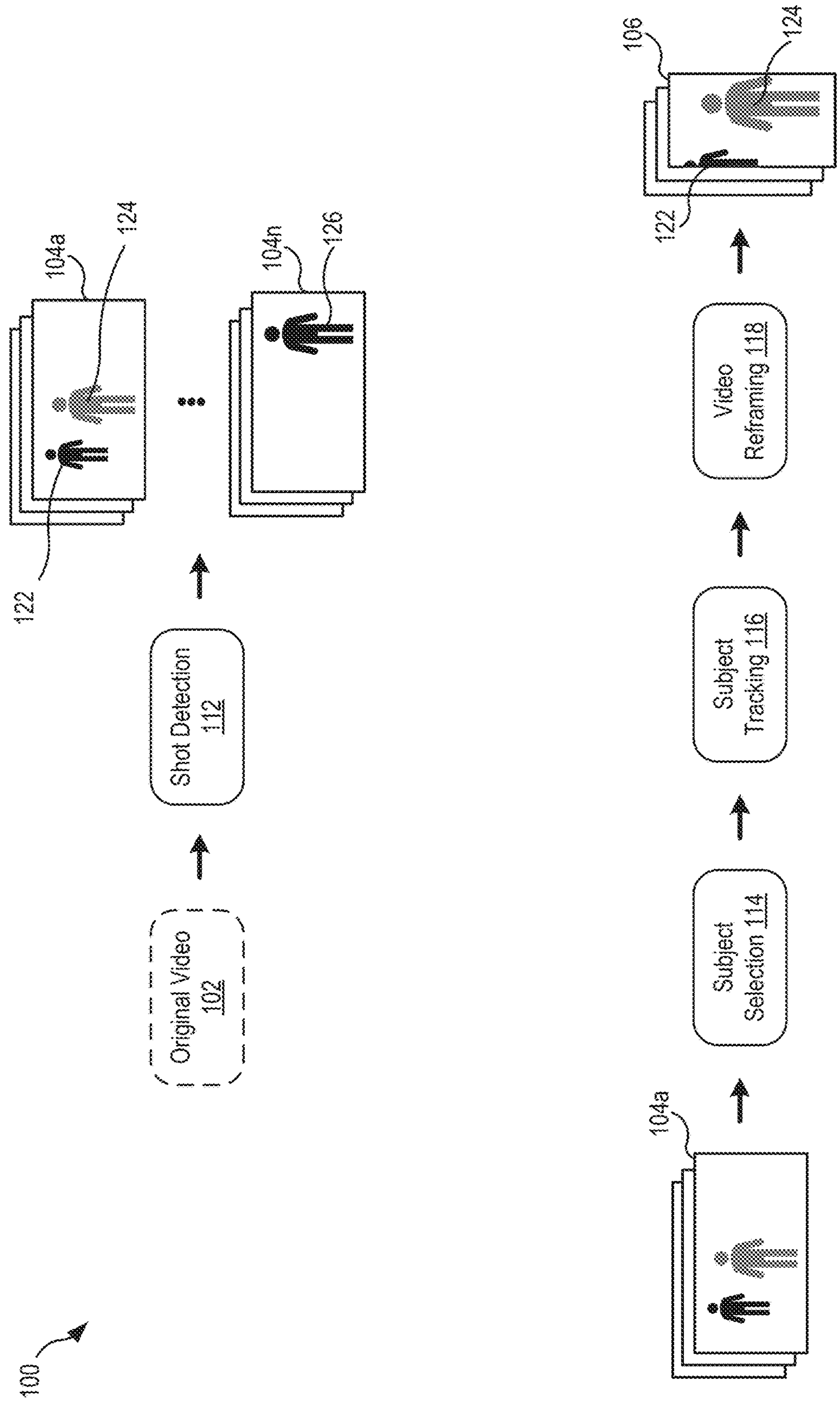
FIG. 1 illustrates a diagram related to techniques for generating portrait aspect ratio videos.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Disclosed examples are directed to, among other things, methods, systems, devices, and computer-readable storage media (collectively, techniques) to automatically generate portrait aspect ratio videos from landscape aspect ratio videos. Aspect ratios are used to denote ratios between the width and height of a video frame and are measured in pixels. For example, an aspect ratio of 9:16 indicates that there are nine pixels of width for every sixteen pixels of height. Video frames that have a portrait aspect ratio have a height greater than their width. Example portrait aspect ratios include 9:16, 9:18, 2:3, 3:4, or other ratios where the height of the video frame is taller than the width of the video frame is wide. Video frames that have a landscape aspect ratio have a width greater than their height. Example landscape aspect ratios include 16:9, 16:10, 4:3, 3:2, or other ratios where the width of the video frame is wider than the height of the video frame is tall. In some examples, the techniques described herein can be used to generate a portrait aspect ratio video from a square aspect ratio video of 1:1. The techniques described herein are used to generate a portrait aspect ratio video that follows a main subject of an original landscape video. For example, the techniques described herein are used to generate a 9:16 aspect ratio video that follows a main subject of the original 16:9 aspect ratio video. The techniques described herein contrast with fitting the original landscape aspect ratio to a portrait oriented screen. For example, when a video is requested to be changed from landscape to portrait, some video editing tools may simply add large black bars (e.g., empty space) to the top and bottom of video frames while maintaining the video in a landscape aspect ratio. In such examples, the video is displayed in a significantly smaller portion of the display. In some examples, the techniques described herein include detecting a primary subject (e.g., an object such as a person or other animal) for each shot of a video and generating portrait aspect ratio video frames that smoothly track the primary subject. In this way, the primary subject may appear to be zoomed in for the portrait aspect ratio video frames as compared to the original landscape video frames. In the following examples, portrait aspect ratio videos and portrait aspect ratio video frames are referred to as portrait videos and portrait video frames, respectively. Likewise, landscape aspect ratio videos and landscape aspect ratio video frames are referred to herein as landscape videos and landscape video frames, respectively.

The techniques described herein provide advantages over simple cropping or resizing methods by intelligently following the main subjects of the original landscape video, resulting in a more engaging and content-rich viewing experience on portrait-oriented displays. This approach preserves the key visual content and narrative of the original video while optimizing it for the increasingly common portrait viewing format of mobile devices, potentially increasing viewer engagement and satisfaction.

The techniques described herein include shot detection, subject detection, subject tracking, and video reframing. Shot detection can include dividing a video into multiple shots. Shots represent different perspectives of a scene. For example, a first camera angle is a different shot from a second camera angle of a first scene. Likewise, a first scene with a first background is a different shot from a second scene with a second background. In some examples, a subject leaving the video frame can create an additional shot separate from when the subject was in the video frame. In some examples, a subject leaving the video frame does not create an additional shot separate from when the subject was in the video frame. By dividing a video into shots, a primary subject can be identified for the shot and followed in the portrait aspect ratio video. When identifying an anchor frame for each shot of a video, any frame of a shot can be used. In some examples, the first frame of a shot can be the anchor frame. The anchor frame can be used to determine a primary subject for a shot. For example, a shot may include two people talking. The first frame of the shot can be designated as an anchor frame.

Subject detection can include identifying a primary subject in the anchor frame. In some cases, one of the people in the shot may be designated as the primary subject of the shot. Determining the primary subject of the shot can be based on the salience of each subject of the anchor frame. A more visually important subject is considered more salient. Subject tracking can then be used to follow the designated primary subject throughout the other video frames in the portrait video while the audio remains the same from the original landscape video. By following a primary subject, the portrait video can attempt to convey the same important information to the viewer regarding the shot as the original landscape video.

Subject tracking can include determining a bounding box for each subject in a video. For example, subject tracking can be used to determine a bounding box for the primary subject for the portrait video. The bounding box for the primary subject can be used to make sure that the generated portrait video frames accurately reflect the primary subject.

Subject tracking can also include generating portrait aspect ratio bounding boxes for the primary subject. The primary subject bounding box may not be a portrait aspect ratio. For example, a primary subject may be sitting on the ground and the associated bounding box is closer to a 1:1 aspect ratio. A pixel weight mask can be used to represent which pixels of a landscape frame are associated with the primary subject and which pixels are not. The pixel weight mask can be used to determine a portrait aspect ratio cutout centered on the primary subject's center of mass. In this way, the portrait aspect ratio cutout can be used as a basis for the portrait video frame. Centering the portrait aspect ratio cutout on the primary subject's center of mass can be done by use of the pixel weight mask. Once subject tracking is used to determine bounding boxes for the primary subject across each frame, each frame can now be processed via video reframing.

Video reframing can include trajectory smoothing. The portrait aspect ratio cutouts around the primary subject's center of mass may produce a jittering effect if used for the portrait video. The jittering effect can degrade the visual quality of the portrait aspect ratio video. Trajectory smoothing can be used to adjust portrait aspect ratio cutouts as needed to reduce and/or eliminate jittering when generating the portrait aspect ratio frame. Trajectory smoothing is used to increase temporal smoothness when viewing the generated portrait video.

The techniques described herein can also be used for shots that include text. For example, a shot may be associated with text appearing on the display (for example, a title being displayed). In some examples, these shots do not have subjects like a person or animal. In these cases, the pixels at the top and bottom edge of the landscape video frame can be warped (for example, stretched) to fit the portrait aspect ratio. In some examples, the new portrait aspect ratio frame may include too many pixels and may need to be scaled down to the proper dimensions. The same techniques can be used for shots that include both subjects and text.

In one example of generating a portrait video from a landscape video, a content editing engine receives a 16:9 aspect ratio landscape video of a man and a woman talking. The service is used to determine a primary subject of the landscape video from the first frame. In this example, the woman is designated as the primary subject. The woman may be designated as the primary subject of the video because she is facing towards the camera and her face is unobscured while the man's side is facing towards the camera. The service then identifies the bounding boxes of the woman in the other frames of the landscape video, but the bounding boxes of the woman may not be a 9:16 portrait aspect ratio. For each video frame, the service can generate a pixel weight mask indicating which pixels belong to the primary subject woman. The pixel weight mask can be used to determine the center of mass of the woman as the eventual center of the portrait frame. The service can then generate portrait aspect ratio bounding boxes around the woman centered around the center of mass. If these portrait aspect ratio bounding boxes are used to generate the portrait video, there may be a jittering effect between frames as the bounding boxes may change too much between frames. The jittering effect can seem to cause the portrait video to be shaking. The service can apply trajectory smoothing to the video frames in order to make transitions between frames smooth and eliminate the jittering effect. Once this is all complete, the service has generated a portrait 9:16 aspect ratio video from a landscape 16:9 aspect ratio video.

FIG. 1 illustrates an exemplary sequence of steps to be applied to a landscape video in order to generate a portrait video. A content editing engine (for example, the content editing application 536 of FIG. 5) on a computing device can carry out the steps, sequences, and processes described herein. A content editing engine, as used herein, is substantially similar or equivalent to a content editing service. The original video 102 is a landscape video. Shot detection 112 can then be applied to the original video 102 to divide the original video 102 into shots 104*a*-104*n*. Each shot represents a different point-of-view or different scene. For example, the shot 104*a* has a first subject 122 and a second subject 124 while the shot 104*n* includes a third subject 126. In this case, shot 104*a* represents a different scene with different subjects than shot 104*n*. In another example, a shot may include both the first subject 122 and the second subject 124 but from a different point-of-view such as behind the subjects 122, 124 while shot 104*a* had a point-of-view from in front of the subjects 122, 124. Shot detection 112 is used in order to segment the original video 102 into shots that may have different primary subjects.

In some examples, shot detection 112 can detect when a current video frame is significantly different than a previous video frame. For example, a current video frame may be significantly different than a previous video frame if there is a change in scene or point-of-view.

In some examples, shot detection 112 can be accomplished by use of an artificial intelligence model such as a machine learning model. The inputs to the shot detection 112 model can include a threshold value and a video. In some examples, the threshold value can be used to determine how different a previous frame can be from a current frame. In some examples, the threshold value can be used as a minimum confidence level that there has been a transition between the current video frame and the previous video frame.

Once the original video 102 is divided into shots 104*a*-104*n*, each shot can be processed via subject selection 114, subject tracking 116, and video reframing 118 to output portrait frames related to the shot. Subject selection 114 can be used to identify subjects in the shot and to select a primary subject. Subject selection begins by identifying an anchor frame of the shot. The anchor frame can be used to identify who is the primary subject of the shot. In some examples, the anchor frame is the first chronological frame of the shot. In some examples, the anchor frame is a chronologically intermediate or chronologically last frame of a shot.

Once an anchor frame is selected, a primary subject can be selected from the anchor frame. A primary subject can be the subject that will be the main focus of the portrait frames for the shot. There are a variety of ways to determine the primary subject of an anchor frame. In some examples, the primary subject can be selected by input from a user. In some examples, the primary subject can be determined using salient object ranking across the one or more subjects in the anchor frame. Salient objects can be referred to herein as subjects. Salient object ranking can be based on the relative size of the subjects, the relative direction each subject is facing, the relative size of faces of the subjects, the closeness or distance of each subject in relation to the center of the frame, clarity/blurriness of each subject, the viewability of each subject's face, viewability of a front side of each subject, and other factors. In some examples, salient object ranking can be accomplished via use of an artificial intelligence model trained to detect objects and then rank objects in terms of importance to the visual quality of a video. Subject selection 114 is further detailed in relation to FIG. 2.

Once a primary subject has been determined for the anchor frame, subject tracking 116 can be used to identify the primary subject in other frames of the shot. Subject tracking 116 can include generating first bounding boxes around the primary subject in each frame of a shot. In some examples, the first bounding boxes can be referred to as crude bounding boxes. These first bounding boxes can be an aspect ratio or size as warranted by the size and dimensions of the primary subject.

The first bounding boxes can be used to generate second bounding boxes. In some examples, the second bounding boxes can be referred to as refined bounding boxes. The second bounding boxes can have a portrait aspect ratio. For example, a portrait aspect ratio of 9:16 can be used for the second bounding boxes. In some examples, the second bounding boxes can have a maximum height. For example, if the original video was 1920×1080 pixels, the height of the portrait frame can be 1080 pixels. If the portrait aspect ratio is 9:16, the width can be 607.5 pixels (or rounded to 607 or 608 to represent whole pixels). In some examples, the second bounding boxes can be centered on the center of the first bounding boxes. In some examples, the second bounding boxes can be centered on the center of mass of the primary subject. The center of mass of the primary subject can be determined by use of a pixel weight mask. The pixel weight mask can identify pixels associated with the primary subject. The center of mass can be determined by determining a point where approximately the same amount of the pixel weight mask is on either side of the center of mass. Subject tracking 116 is further detailed in relation to FIG. 3.

Video reframing 118 can be used to adjust the second bounding boxes and generate the portrait frames to be used in the final portrait video. Video reframing 118 can include trajectory smoothing to remove jitteriness between individual second bounding boxes. Trajectory smoothing can be accomplished by use of a Gaussian process regression across a particular coordinate of each secondary boundary box. For example, each second bounding box can include a leftmost coordinate. Because each second bounding box has the same pixel height and pixel width, a single x coordinate for the leftmost pixel of the second bounding box can be used to determine the position of each second bounding box.

Once each shot of the video has been processed via subject detection 114, subject tracking 116, and video reframing 118, the shots can be concatenated together to create the final portrait aspect ratio video. The video can also be resized to whatever pixel dimensions are needed. For example, a 1920×1080 landscape video with an aspect ratio of 16:9 can be used to generate a 607.5×1080 portrait video (or more likely 608×1080 pixel) with a 9:16 aspect ratio. Then the portrait video can be scaled to 1080×1920 or 2160×3840, or any other 9:16 aspect ratio.

In some examples, a shot can have no subjects. For example, a shot may include be text or a graphical image such as a logo or pictogram. Subjects are typically objects that move such as people, animals, and machines. If a shot has no subjects, the landscape frames can be warped to expand the vertical dimension by stretching the topmost and bottom most pixels. This type of warping can be referred to as regional selective warping because only a small region at the top and bottom of the landscape frame will be warped. In one example, the original landscape frame with no subjects can be 1920×1080 pixels (or a 16:9 aspect ratio). The original landscape frame can be warped to be 1920×3413.33 pixels to meet a 9:16 aspect ratio (or rounded to 3413 pixels) by stretching the topmost and bottom most pixels (for example, the top 5-20 pixels and the bottom 5-20 pixels) across the new dimensions of the portrait aspect ratio. Then the portrait aspect ratio frame can be reduced to a particular pixel size. For example, the 1920×3413 pixel portrait frame can be scaled down to 1080×1920 while maintaining the overall aspect ratio of the portrait frame. Video reframing 118 is further described in relation to FIG. 3.

In some examples, the techniques described herein can be used to generate a portrait aspect ratio video from a square aspect ratio video of 1:1. For example, a video can have a 1080×1080 pixels. A portrait aspect ratio video of 607.5×1080 portrait video (or more likely 608×1080 pixel) can be generated from the square aspect ratio video. All techniques described as operating on a landscape video can also be applied to a square aspect ratio video.

Figure 2:
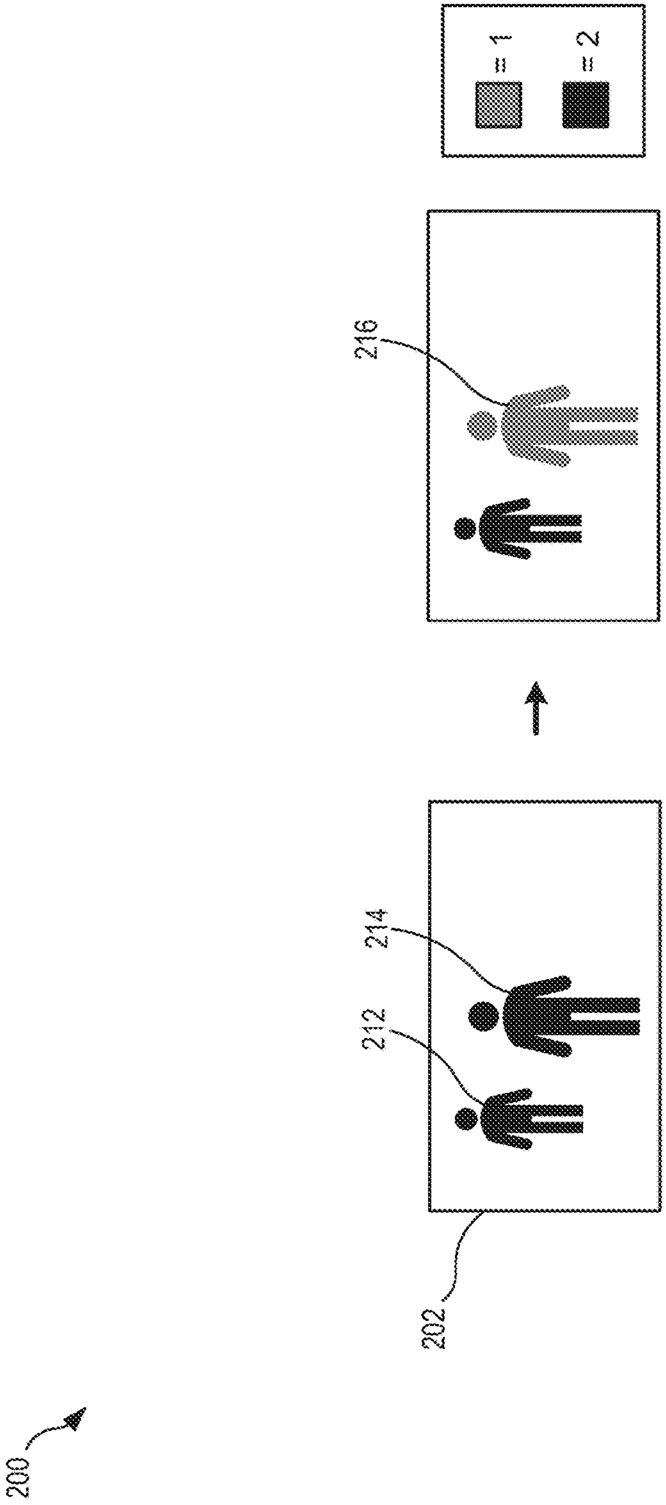
FIG. 2 illustrates a diagram of techniques for generating portrait aspect ratio videos.

FIG. 2 illustrates an example diagram of subject selection (for example, subject selection 114 of FIG. 1). As shown in FIG. 2, frame 202 can be chosen to be the anchor frame for a shot involving a first subject 212 and a second subject 214. In some examples, the anchor frame can be selected by a user. In some examples, the anchor frame can be a chronologically first frame of the shot. In some examples, the anchor frame can be a chronologically last frame of the shot. In some examples, the anchor frame can be a chronologically intermediate frame of the shot. The anchor frame can also be determined by determining which subject of the plurality of subjects is the primary subject in the majority of frames of the shot and then selecting one of the frames with that primary subject as the anchor frame. For example, if a shot includes 525 frames, a particular woman may be the primary subject in 263 of the frames in order to be designated as the primary subject for the shot. However, in some examples, there can be more than one primary subject. For example, if two people are close enough together in a landscape frame, they can both be primary subjects.

Once an anchor frame has been established for a shot, a primary subject for the anchor frame can be determined. In some examples, the primary subject is determined by use of a salient object detection artificial intelligence model. The salient object detection model can be designed to determine the most visually important objects (e.g., one or more people, animals, or moving objects). The salient object detection artificial intelligence model can use factors such as size of a subject, the facing direction of a subject, the size of a face of the subject, and other factors to determine which subjects should be ranked higher than others. The highest ranked subject can be the primary subject for an anchor frame. For example, the second subject 214 can be designated as the primary subject 216 as shown in FIG. 2.

Figure 3:
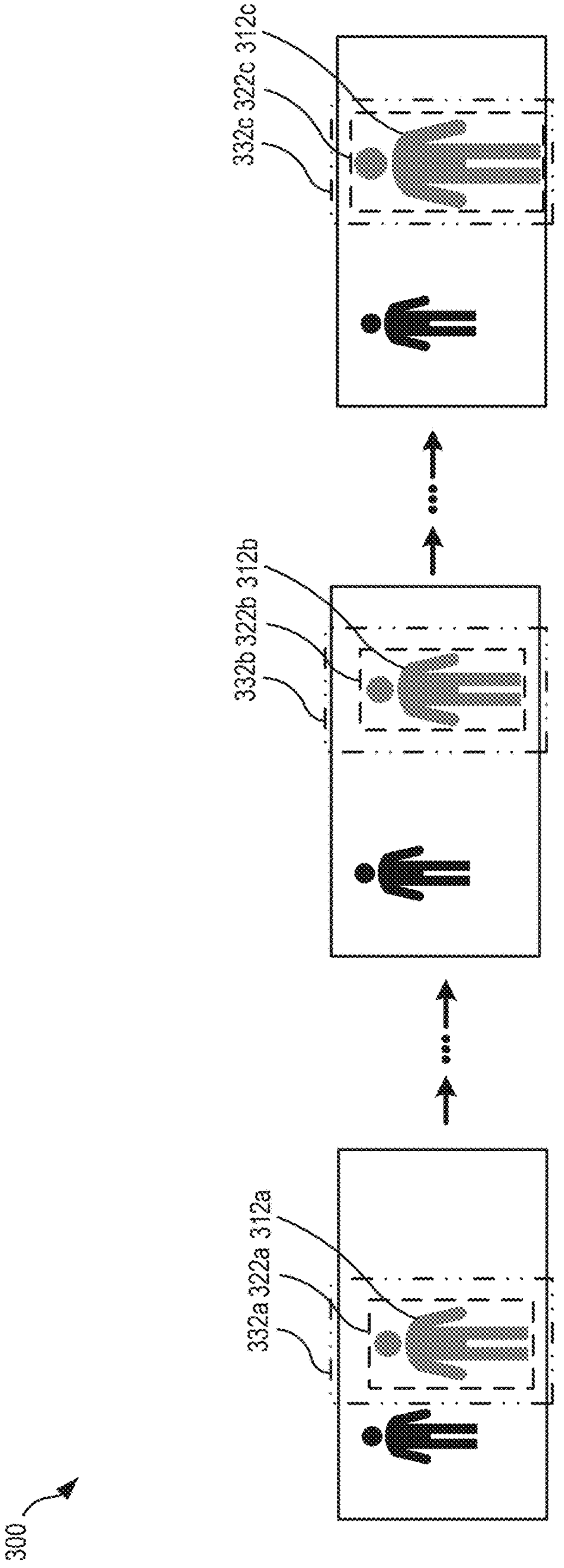
FIG. 3 illustrates a diagram of techniques for generating portrait aspect ratio videos.

The salient object detection model can be used to obtain the mass of salient objects, as well as each object's rank according to the object's salience, locations, and other selection criteria. The mass of salient objects can refer to the pixels that are associated with the salient object. A mask can be used where different scores are assigned to pixels of the mass of salient objects based on the object's rank with higher ranked objects having greater scores. As a portrait frame may not cover the whole of a subject, different scores can also be applied to different parts of subjects. For example, the pixels that are associated with a human face can be assigned higher scores than other pixels associated with a person or animal. A different artificial intelligence model can be used to detect human faces, such as a face detection model. A crop window can then be slid across the anchor frame to select a cropping region when the cropping window covers the mass with the highest average weights. The primary subjects are the subjects bounded in the cropping region. In this way, there can be more than one primary subject for an anchor frame and corresponding shot. For example, if two people are close enough together in a landscape frame, they can both be primary subjects. However, one of the primary subjects can have a higher rank than the other primary subject. In some examples, a primary subject with a higher rank than another primary subject can also be referred to herein as the primary subject. FIG. 3 illustrates an example diagram of subject tracking (for example, subject tracking 116 of FIG. 1) and video reframing (for example, video reframing 118 of FIG. 1). Once a primary subject has been determined from an anchor frame in subject selection, subject tracking can be used to follow the primary subject across the frames of the shot. The primary subject can be identified in each frame as shown by the primary subject 312*a*, 312*b*, 312*c* in their respective frames. Then a first bounding box can be generated around the primary subject. For example, the first bounding boxes 322*a*, 322*b*, 322*c* correspond to the primary subjects 312*a*, 312*b*, 312*c* respectively. The first bounding box can be referred to as a crude bounding box. The first bounding box can simply be a bounding box for the primary subject.

Once subject tracking has been applied to all of the frames of the original landscape video, video reframing can create shots with a portrait aspect ratio. The first bounding boxes can be used to generate second bounding boxes. The second bounding boxes have the chosen portrait aspect ratio. For example, if the chosen portrait aspect ratio is 9:16, then the second bounding boxes will have a portrait aspect ratio of 9:16. Furthermore, the pixel height of the second bounding box can be the height of the landscape video frame. For example, if the original landscape video had video frames that were 1920×1080 pixels, the height of the new portrait frame will be 1080 pixels. In some examples, the second bounding box can be centered on the horizontal center (for example, the center x-coordinate) of the first bounding box. In some examples, the second bounding box can be centered on the center of mass of the primary subject. The center of mass of the primary subject can be determined by the use of a pixel weight mask of pixels associated with the primary subject. The center of mass can represent the weighted center of the pixel weight mask. In some examples, the face of the primary subject has higher weights than other pixels of the primary subject. In this example, the pixel weight mask is instead replaced with a pixel weight mask. In this way, the center of mass of the primary subject may be more influenced by the pixels associated with a face of the primary subject.

In some examples, the first bounding box is larger than the second bounding box. For example, the primary subject may be larger than the portrait aspect ratio. In some examples, the first bounding box is smaller than the second bounding box. It is noted that the first bounding box can be different sizes in different frames of the original video.

Once the second bounding boxes are generated, third bounding boxes can be generated based on the second bounding boxes. The third bounding boxes represent the finalized video frames for the scene (and eventually the portrait video). The second bounding boxes may create a jittering effect if used as the portrait video frames. This is because of the roughness of the subject tracking. Trajectory smoothing can be applied to the second bounding boxes to generate the third bounding boxes. Gaussian process regressions can be used to smooth out the x-coordinate of the left-most part of each second bounding box in relation to the landscape video. For example, three frames can be adjacent in a video. The first frame may have a left-most coordinate at an x-coordinate of 20, the second frame may have a left-most coordinate of 30, and the third frame may have a left-most coordinate of 80. There may be some jittering between the second and third frame due to the large change in left-most coordinate. Trajectory smoothing can change the second frame to have a left-most coordinate of 50 in order to minimize the jitteriness between the three frames. In this way, the second frame may no longer be centered on the center of mass of the primary subject, but temporal smoothness is preserved for the video. Temporal smoothness improves the viewing experience.

Figure 4:
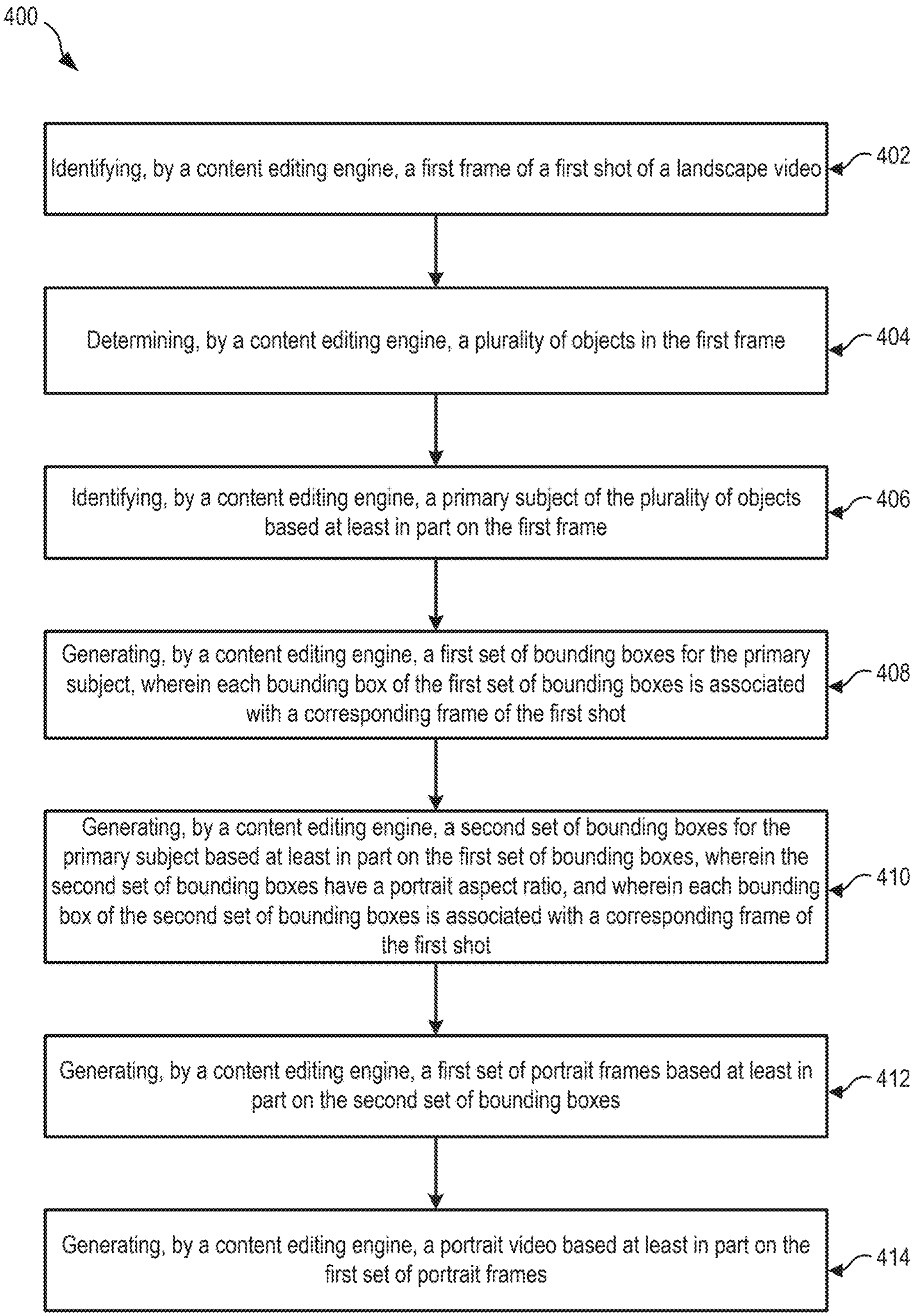
FIG. 4 illustrates a flow diagram of techniques for generating portrait aspect ratio videos.

FIG. 4 illustrates an example process 400 to automatically change original patterns in frame compilations to be replaced with new patterns while preserving characteristics of the original patterns. One or more parts of process 400 can be performed by a content editing engine (for example, the content editing application 536 of FIG. 5).

Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 402, the content editing engine can identify a first frame of a first shot of a landscape video. The first frame can be a chronologically first frame of the first shot. The first frame can be a chronologically intermediate frame of the first shot. The first frame can be a chronologically last frame of the first shot. The landscape video can have an aspect ratio of 16:9. At block 404, the content editing engine can determine a plurality of objects in the first frame.

At block 406, the content editing engine can identify a primary subject of the plurality of objects based at least in part on the first frame. Identifying the primary subject can include ranking each subject of the plurality of objects based on factors including one or more of: viewability of subjects' faces, viewability of front side of subjects, and how close a subject is to a center of the first frame. In some examples, identifying the primary subject can include receiving an indication that a subject of the plurality of objects is the primary subject.

At block 408, the content editing engine can generate a first set of bounding boxes for the primary subject, wherein each bounding box of the first set of bounding boxes is associated with a corresponding frame of the first shot. At block 410, the content editing engine can generate a second set of bounding boxes for the primary subject based at least in part on the first set of bounding boxes. The second set of bounding boxes can have a portrait aspect ratio. Each bounding box of the second set of bounding boxes can be associated with a corresponding frame of the first shot.

At block 412, the content editing engine can generate a first set of portrait frames based at least in part on the second set of bounding boxes. At block 414, the content editing engine can generate a portrait video based at least in part on the first set of portrait frames. The portrait video can have an aspect ratio of 9:16.

Process 400 can further include the content editing engine generating a set of pixel weight masks. Each pixel weight mask can be associated with a corresponding frame of the first shot. Higher pixel weights can be assigned to pixels of the pixel weight mask that correspond to the primary subject. Generating the second set of bounding boxes for the primary subject can be further based at least in part on the set of pixel weight masks. Higher pixel weights can be assigned to pixels of the pixel weight mask that correspond to a face of the primary subject than pixels associated with the primary subject but not associated with the face of the primary subject.

Process 400 can further include the content editing engine generating a third set of bounding boxes for the primary subject based at least in part on applying trajectory smoothing between the second set of bounding boxes. Each bounding box of the third set of bounding boxes can be associated with a corresponding frame of the first shot. Generating the first set of portrait frames can be further based at least in part on the third set of bounding boxes.

Process 400 can further include the content editing engine identifying one or more shots from the landscape video including the first shot. Each shot of the one or more shots can be distinguishable from other shots by at least one of: point-of-view of the plurality of objects, distance to the plurality of subjects, and a change in scenery.

Process 400 can further include identifying a second frame of a second shot of the landscape video. Process 400 can further include determining a second plurality of objects in the second frame. Process 400 can further include identifying a second primary subject of the second plurality of objects based at least in part on the second frame. Process 400 can further include generating a third set of bounding boxes for the second primary subject. Each bounding box of the third set of bounding boxes can be associated with a corresponding frame of the second shot. Process 400 can further include generating a fourth set of bounding boxes for the second primary subject based at least in part on the third set of bounding boxes. The fourth set of bounding boxes can have a portrait aspect ratio. Each bounding box of the fourth set of bounding boxes can be associated with a corresponding frame of the second shot. Process 400 can further include generating a second set of portrait frames based at least in part on the fourth set of bounding boxes. Generating the portrait video can be further based at least in part on the second set of portrait frames.

Process 400 can further include identifying a second shot wherein the second shot does not include a subject. Process 400 can further include generating a set of warped frames based at least in part on a set of landscape frames of the second shot. The warped frames can have a portrait aspect ratio. Generating the portrait video can be further based at least in part on the warped frames.

Figure 5:
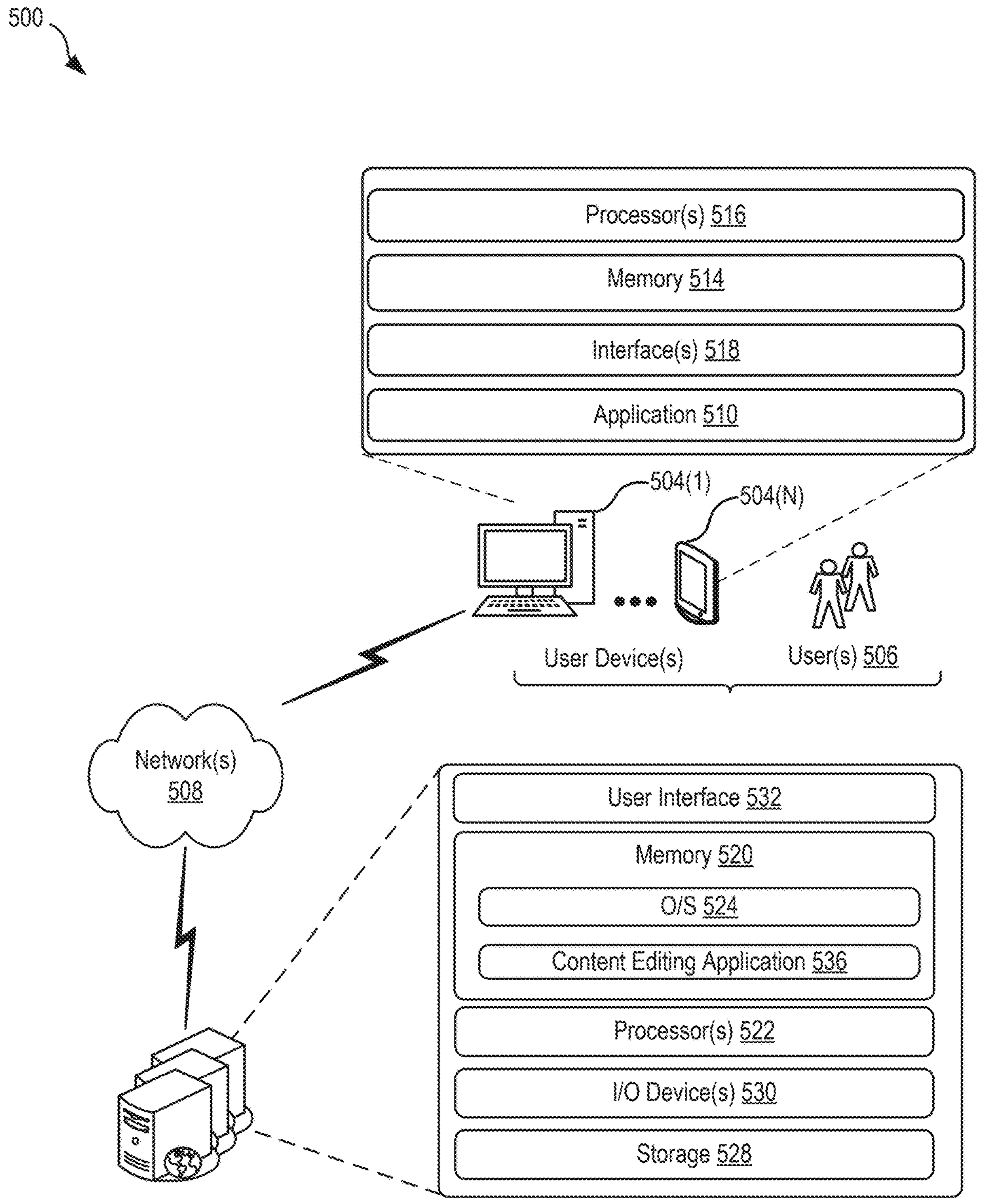
FIG. 5 illustrates an example schematic architecture for implementing techniques for generating portrait aspect ratio videos.

FIG. 5 illustrates an example schematic architecture 500 for implementing techniques relating to automatically changing original patterns in frame compilations to be replaced with new patterns while preserving characteristics of the original patterns. The architecture 500 may include a computer system 502 (e.g., the computer system described herein) in communication with one or more user devices 504(1)-504(N) via one or more networks 508 (hereinafter, "the network 508").

The computer system 502 may include one or more computer system computers, perhaps arranged in a cluster of servers or as a server farm, and may host web service applications. The function of the computer system 502 may be implemented a cloud-based environment such that individual components of the computer system 502 are virtual resources in a distributed environment.

The computer system 502 may include at least one memory 520 and one or more processing units (or processor (s)) 522. The processor 522 may be implemented as appropriate in hardware, computer-executable instructions, software, firmware, or combinations thereof. Computer-executable instruction, software, or firmware implementations of the processor 522 may include computer-executable or machine-executable instructions written in any suitable programming language to perform the various functions described. The memory 520 may include more than one memory and may be distributed throughout the computer system 502. The memory 520 may store program instructions that are loadable and executable on the processor(s) 522, as well as data generated during the execution of these programs. Depending on the configuration and type of memory including the computer system 502, the memory 520 may be volatile (such as RAM and/or non-volatile (such as read-only memory ("ROM"), flash memory, or other memory)). The memory 520 may include an operating system 524 and one or more application programs, modules, or services (for example, content editing application 536, also referred to as a content editing engine) for implementing the features disclosed herein.

The computer system 502 may also include additional storage 528, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 528, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 502 and/or part of the user device 504.

The computer system 502 may also include input/output (I/O) device(s) and/or ports 530, such as for enabling connection with a keyboard, a mouse, a pen, a voice input device, a touch input device, a display, speakers, a printer, or other I/O device.

In some examples, the computer system 502 may also include one or more user interface(s) 532. The user interface 532 may be utilized by an operator, curator, or other authorized user to access portions of the computer system 502. In some examples, the user interface 532 may include a graphical user interface, voice interfaces, web-based applications, programmatic interfaces such as APIs, or other user interface configurations.

The computer system 502 may also include a data store 501. In some examples, the data store 501 may include one or more databases, data structures, or the like for storing and/or retaining information associated with the computer system 502 and which, in some examples, may be accessible by the user devices 504.

Turning now to the details of the user device 504, the user device 504 may be operable by one or more users 506 to interact with the computer system 502. The user device 504 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 504(1) is illustrated as a desktop computer, while the user device 504(N) is illustrated as an example of a handheld mobile device.

The user device 504 may include a memory 514 and processor(s) 516. In the memory 514 may be stored program instructions that are loadable and executable on the processor(s) 516, as well as data generated during the execution of these programs. Depending on the configuration and type of user device 504, the memory 514 may be volatile (such as random access memory ("RAM")) and/or non-volatile (such as read-only memory (ROM), flash memory, etc.). The user device 504 can also include an application 510 that performs all or some portions of the techniques described herein. The user device 504 may also include one or more interfaces 518 to enable communication with other devices, systems, and the like.

Figure 6:
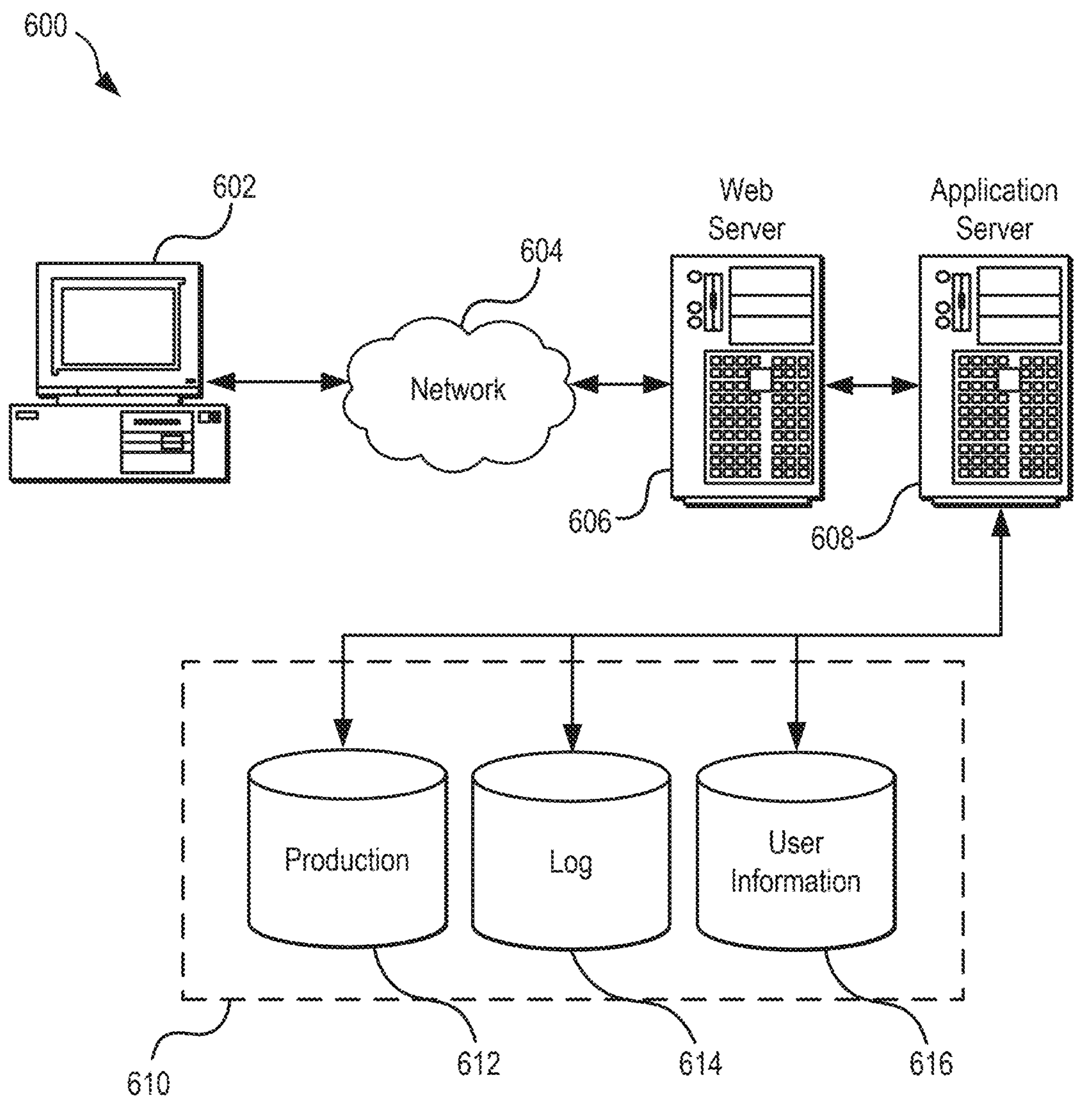
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

identifying, by a content editing engine, a first frame of a first shot of a landscape video;

determining, by the content editing engine, a plurality of objects in the first shot;

identifying, by the content editing engine, a primary subject of the plurality of objects based at least in part on the first frame;

generating, by the content editing engine, a first set of bounding boxes for the primary subject, wherein each bounding box of the first set of bounding boxes is associated with a corresponding frame of the first shot;

generating, by the content editing engine, a second set of bounding boxes for the primary subject based at least in part on the first set of bounding boxes, wherein the second set of bounding boxes have a portrait aspect ratio, and wherein each bounding box of the second set of bounding boxes is associated with a corresponding frame of the first shot;

generating, by the content editing engine, a first set of portrait frames based at least in part on the second set of bounding boxes; and generating, by the content editing engine, a portrait video based at least in part on the first set of portrait frames.

2. The computer-implemented method of claim 1, further comprising:

generating, by the content editing engine, a set of pixel weight masks, wherein each pixel weight mask is associated with a corresponding frame of the first shot, wherein higher pixel weights are assigned to pixels of the pixel weight mask that correspond to the primary subject; and wherein generating the second set of bounding boxes for the primary subject is further based at least in part on the set of pixel weight masks.

3. The computer-implemented method of claim 1, further comprising generating, by the content editing engine, a third set of bounding boxes for the primary subject based at least in part on applying trajectory smoothing between the second set of bounding boxes, and wherein each bounding box of the third set of bounding boxes is associated with a corresponding frame of the first shot; and wherein generating the first set of portrait frames is further based at least in part on the third set of bounding boxes.

4. The computer-implemented method of claim 1, wherein the first frame is a chronologically first frame of the first shot.

5. One or more non-transitory computer-readable media comprising computer-executable instructions that, when executed by one or more processors of a first computer system, cause the first computer system to perform operations comprising:

identifying a first frame of a first shot of a landscape video;

determining a plurality of objects in the first frame;

identifying a primary subject of the plurality of objects based at least in part on the first frame;

generating a first set of bounding boxes for the primary subject, wherein each bounding box of the first set of bounding boxes is associated with a corresponding frame of the first shot;

generating a second set of bounding boxes for the primary subject based at least in part on the first set of bounding boxes, wherein the second set of bounding boxes have a portrait aspect ratio, and wherein each bounding box of the second set of bounding boxes is associated with a corresponding frame of the first shot;

generating a first set of portrait frames based at least in part on the second set of bounding boxes; and generating a portrait video based at least in part on the first set of portrait frames.

6. The one or more non-transitory computer-readable media of claim 5, comprising further computer-executable instructions that, when executed by one or more processors of the first computer system, cause the first computer system to perform further operations comprising:

generating a set of pixel weight masks, wherein each pixel weight mask is associated with a corresponding frame of the first shot, wherein higher pixel weights are assigned to pixels of the pixel weight mask that correspond to the primary; and wherein generating the second set of bounding boxes for the primary subject is further based at least in part on the set of pixel weight masks.

7. The one or more non-transitory computer-readable media of claim 6, wherein higher pixel weights are assigned to pixels of the pixel weight mask that correspond to a face of the primary subject than pixels associated with the primary subject but not associated with the face of the primary subject.

8. The one or more non-transitory computer-readable media of claim 5, comprising further computer-executable instructions that, when executed by one or more processors of the first computer system, cause the first computer system to perform further operations comprising identifying one or more shots from the landscape video including the first shot, wherein each shot of the one or more shots is distinguishable from other shots by at least one of: point-of-view of the plurality of objects, distance to the primary subject, and a change in scenery.

9. The one or more non-transitory computer-readable media of claim 8, comprising further computer-executable instructions that, when executed by one or more processors of the first computer system, cause the first computer system to perform further operations comprising:
identifying a second frame of a second shot of the landscape video;
determining a second plurality of objects in the second frame;
identifying a second primary subject of the second plurality of objects based at least in part on the second frame;
generating a third set of bounding boxes for the second primary subject, wherein each bounding box of the third set of bounding boxes is associated with a corresponding frame of the second shot;
generating a fourth set of bounding boxes for the second primary subject based at least in part on the third set of bounding boxes, wherein the fourth set of bounding boxes have a portrait aspect ratio, and wherein each bounding box of the fourth set of bounding boxes is associated with a corresponding frame of the second shot;
generating a second set of portrait frames based at least in part on the fourth set of bounding boxes; and
wherein generating the portrait video is further based at least in part on the second set of portrait frames.

10. The one or more non-transitory computer-readable media of claim 8, comprising further computer-executable instructions that, when executed by one or more processors of the first computer system, cause the first computer system to perform further operations comprising:
identifying a second shot wherein the second shot does not include a subject;
generating a set of warped frames based at least in part on a set of landscape frames of the second shot, wherein the warped frames have a portrait aspect ratio; and
wherein generating the portrait video is further based at least in part on the 8 warped frames.

11. The one or more non-transitory computer-readable media of claim 5, wherein identifying the primary subject includes ranking each subject of the plurality of objects based on factors including one or more of: viewability of subjects' faces, viewability of front side of subjects, and how close a subject is to a center of the first frame.

12. The one or more non-transitory computer-readable media of claim 5, wherein the first frame is a chronologically intermediate frame of the first shot.

13. A computer system comprising:
one or more processors; and
one or more memories storing instructions that, upon execution by the one or more processors, configure the computer system to:
determine a plurality of objects in a first landscape frame of a first shot of a landscape video;
identify a first frame of the first shot;
identify a primary subject of the plurality of objects based at least in part on the first frame;
generate a first set of bounding boxes for the primary subject, wherein each bounding box of the first set of bounding boxes is associated with a corresponding frame of the first shot;
generate a second set of bounding boxes for the primary subject based at least in part on the first set of bounding boxes, wherein the second set of bounding boxes have a portrait aspect ratio, and wherein each bounding box of the second set of bounding boxes is associated with a corresponding frame of the first shot;
generate a first set of portrait frames based at least in part on the second set of bounding boxes; and
generate a portrait video based at least in part on the first set of portrait frames.

14. The computer system of claim 13, wherein the one or more memories store further instructions that, upon execution by the one or more processors further configure the computer system to:
generate a set of pixel weight masks, wherein each pixel weight mask is associated with a corresponding frame of the first shot, wherein higher pixel weights are assigned to pixels of the pixel weight mask that correspond to the primary subject; and
wherein generating the second set of bounding boxes for the primary subject is further based at least in part on the set of pixel weight masks.

15. The computer system of claim 13, wherein the one or more memories store further instructions that, upon execution by the one or more processors further configure the computer system to identify one or more shots from the landscape video including the first shot, wherein each shot of the one or more shots is distinguishable from other shots by at least one of: point-of-view of the plurality of objects, distance to the plurality of subjects, and a change in scenery.

16. The computer system of claim 13, wherein the one or more memories store further instructions that, upon execution by the one or more processors further configure the computer system to:
identify a second frame of a second shot of the landscape video;
determine a second plurality of objects in the second frame;
identify a second primary subject of the second plurality of objects based at least in part on the second frame;
generate a third set of bounding boxes for the second primary subject, wherein each bounding box of the third set of bounding boxes is associated with a corresponding frame of the second shot;
generate a fourth set of bounding boxes for the second primary subject based at least in part on the third set of bounding boxes, wherein the fourth set of bounding boxes have a portrait aspect ratio, and wherein each bounding box of the fourth set of bounding boxes is associated with a corresponding frame of the second shot;
generate a second set of portrait frames based at least in part on the fourth set of bounding boxes; and
wherein generating the portrait video is further based at least in part on the second set of portrait frames.

17. The computer system of claim 13, wherein the first frame is a chronologically last frame of the first shot.

18. The computer system of claim 13, wherein identifying the primary subject includes receiving an indication that a subject of the plurality of objects is the primary subject.

19. The computer system of claim 13, wherein the landscape video has an aspect ratio of 16:9.

20. The computer system of claim 13, wherein the portrait video has an aspect ratio of 9:16.

* * * * *